United States Patent
Kim et al.

(10) Patent No.: US 11,214,143 B2
(45) Date of Patent: Jan. 4, 2022

(54) VISUALLY OBSTRUCTED OBJECT DETECTION FOR AUTOMATED VEHICLE USING V2V/V2I COMMUNICATIONS

(71) Applicant: Motional AD LLC, Boston, MA (US)

(72) Inventors: Junsung Kim, Pittsburgh, PA (US); Gaurav Bhatia, Pittsburgh, PA (US)

(73) Assignee: Motional AD LLC, Boston, MA (US)

( * ) Notice: Subject to any disclaimer, the term of this patent is extended or adjusted under 35 U.S.C. 154(b) by 606 days.

(21) Appl. No.: 15/584,743

(22) Filed: May 2, 2017

(65) Prior Publication Data
US 2018/0319280 A1 Nov. 8, 2018

(51) Int. Cl.
*B60W 50/02* (2012.01)
*B60K 31/00* (2006.01)
(Continued)

(52) U.S. Cl.
CPC ...... *B60K 31/0008* (2013.01); *B60T 8/17558* (2013.01); *G01S 7/003* (2013.01); *G01S 13/931* (2013.01); *G01S 17/931* (2020.01); *G05D 1/0287* (2013.01); *G08G 1/161* (2013.01); *G08G 1/163* (2013.01); *G08G 1/166* (2013.01); *B60T 2201/02* (2013.01); *B60W 2554/80* (2020.02); *G01S 13/86* (2013.01); *G01S 2013/9316* (2020.01); *G01S 2013/9319* (2020.01); *G01S 2013/9323* (2020.01); *G05D 2201/0213* (2013.01)

(58) Field of Classification Search
CPC ...... B60W 40/04; B60W 50/02; B60W 50/08; B60W 50/14; G01C 21/34; G01C 22/00
USPC .................................................. 701/23, 32.3
See application file for complete search history.

(56) References Cited

U.S. PATENT DOCUMENTS 9,165,469 B2 * 10/2015 Bowers .................. G08G 1/161
9,587,952 B1 * 3/2017 Slusar ................ G01C 21/3492
(Continued)

FOREIGN PATENT DOCUMENTS

| CN | 102947870 | 2/2013 |
|---|---|---|
| CN | 103563337 | 2/2014 |

(Continued)

OTHER PUBLICATIONS

Florentine et al., "Pedestrian notification methods in autonomous vehicles for multi-class mobility-on-demand service." Proceedings of the Fourth International Conference on Human Agent Interaction, Oct. 4, 2016, pp. 387-392.

(Continued)

*Primary Examiner* — Peter D Nolan
*Assistant Examiner* — Wae L Louie
(74) *Attorney, Agent, or Firm* — Fish & Richardson P.C.

(57) ABSTRACT

An object-detection system for an automated vehicle includes an object-detector, a receiver, and a controller. The object-detector detects detectable-objects proximate to a host-vehicle. The receiver receives an indication of an object-presence from other-transmitters proximate to the host-vehicle. The controller is in communication with the object-detector and the receiver. The controller is configured to operate the host-vehicle to avoid interference with a hidden-object when the hidden-object is not detected by the object-detector and the object-presence is indicated by at least two instances of the other-transmitters.

17 Claims, 2 Drawing Sheets

(51) Int. Cl.
*B60T 8/1755* (2006.01)
*G01S 13/931* (2020.01)
*G08G 1/16* (2006.01)
*G01S 7/00* (2006.01)
*G05D 1/02* (2020.01)
*G01S 17/931* (2020.01)
*G01S 13/86* (2006.01)

(56) References Cited

U.S. PATENT DOCUMENTS

| | | | | |
|---|---|---|---|---|
| 9,646,428 | B1* | 5/2017 | Konrardy | G08G 1/147 |
| 9,816,827 | B1* | 11/2017 | Slusar | G01C 21/3623 |
| 9,963,106 | B1* | 5/2018 | Ricci | B60W 60/0025 |
| 2004/0088089 | A1* | 5/2004 | Bauer | G07C 5/085 |
| | | | | 701/32.3 |
| 2010/0030474 | A1* | 2/2010 | Sawada | B62D 15/0265 |
| | | | | 701/301 |
| 2012/0101660 | A1* | 4/2012 | Hattori | G05D 1/0022 |
| | | | | 701/2 |
| 2014/0009307 | A1* | 1/2014 | Bowers | G08G 1/161 |
| | | | | 340/901 |
| 2015/0112504 | A1* | 4/2015 | Binion | G06Q 40/08 |
| | | | | 701/1 |
| 2015/0112730 | A1* | 4/2015 | Binion | G06Q 40/08 |
| | | | | 705/4 |
| 2015/0375757 | A1* | 12/2015 | Schiek | B60K 35/00 |
| | | | | 701/23 |
| 2016/0355192 | A1* | 12/2016 | James | B60R 11/04 |
| 2017/0046958 | A1* | 2/2017 | Naka | G08G 1/096741 |
| 2017/0050642 | A1* | 2/2017 | Eckman | B60W 40/04 |
| 2017/0084038 | A1* | 3/2017 | Dane | G06K 9/00798 |
| 2018/0188726 | A1* | 7/2018 | Newman | B60W 50/00 |
| 2018/0319280 | A1* | 11/2018 | Kim | G08G 1/161 |
| 2019/0068582 | A1* | 2/2019 | Kim | G07C 5/008 |
| 2019/0382004 | A1* | 12/2019 | Golov | B60W 30/09 |
| 2019/0384304 | A1* | 12/2019 | Towal | G05D 1/0221 |

FOREIGN PATENT DOCUMENTS

| | | |
|---|---|---|
| CN | 104620298 | 5/2015 |
| DE | 102012204880 | 10/2012 |
| DE | 102016204593 | 10/2016 |
| EP | 2881926 | 6/2015 |

OTHER PUBLICATIONS

Pendleton et al., "Autonomous golf cars for public trial of mobility-on-demand service." Intelligent Robots and Systems (IROS), 2015 IEEE/RSJ International Conference on Sep. 28, 2018, pp. 1164-1171.

European Extended Search Report in European Application No. 18167337.7, dated Sep. 27, 2018, 7 pages.

* cited by examiner

US 11,214,143 B2

VISUALLY OBSTRUCTED OBJECT DETECTION FOR AUTOMATED VEHICLE USING V2V/V2I COMMUNICATIONS

TECHNICAL FIELD OF INVENTION

This disclosure generally relates to an object-detection system for an automated vehicle, and more particularly relates to a system that operates the host-vehicle to avoid interference with a hidden-object when a hidden-object that is not detected by an object-detector of a host-vehicle, and an object-presence of the hidden-object is indicated by at least two instances of the other-transmitters communicating with the host-vehicle.

BACKGROUND OF INVENTION

It is known for an automated host-vehicle to detect objects such as an other-vehicle using on-board sensors, and take various actions to avoid a collision with or otherwise impede motion of the other-vehicle. If the other-vehicle is hidden from detection by the on-board detectors of the host-vehicle, it has been suggested that information communicated via Dedicated Short Range Communications (DSRC), e.g. vehicle-to vehicle (V2V) and/or vehicle-to-infrastructure (V2I) communications could be used by the host-vehicle to avoid the other-vehicle. However, there is a risk of hacking or spoofing of the V2V/V2I communication so that a message could indicate that an object is present that is not actually present, or indicate that the future travel-path of the host-vehicle is clear of objects when an object of concern is actually present.

SUMMARY OF THE INVENTION

In accordance with one embodiment, an object-detection system for an automated vehicle is provided. The system includes an object-detector, a receiver, and a controller. The object-detector detects detectable-objects proximate to a host-vehicle. The receiver receives an indication of an object-presence from other-transmitters proximate to the host-vehicle. The controller is in communication with the object-detector and the receiver. The controller is configured to operate the host-vehicle to avoid interference with a hidden-object when the hidden-object is not detected by the object-detector and the object-presence is indicated by at least two instances of the other-transmitters.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
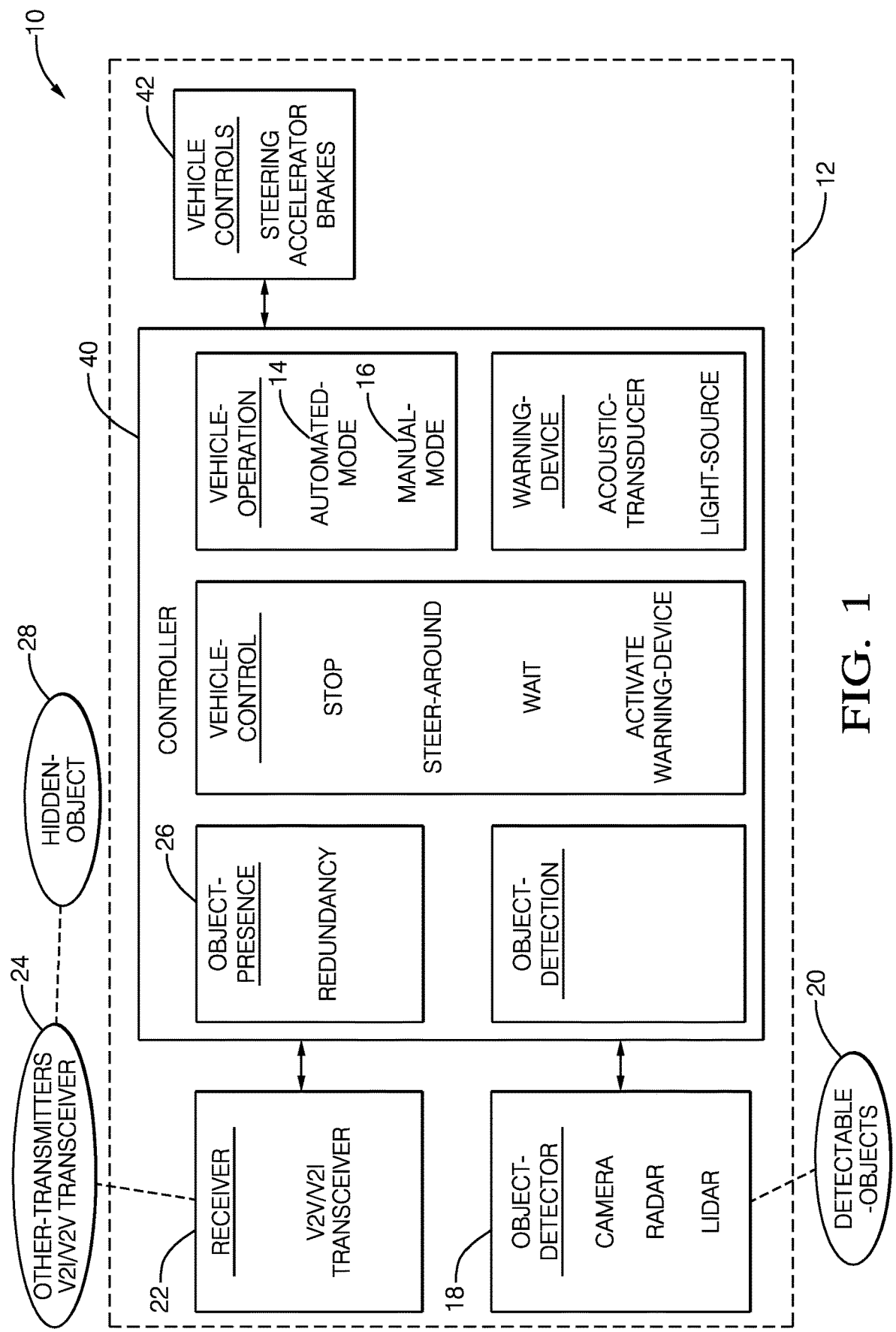
FIG. 1 is a diagram of an object-detection system in accordance with one embodiment.

FIG. 1 illustrates a non-limiting example of an object-detection system 10, hereafter referred to as the system 10, which is generally suitable for use by an automated vehicle, e.g. a host-vehicle 12. As used herein, the term automated vehicle may apply to instances when the host-vehicle 12 is being operated in an automated-mode 14, i.e. a fully autonomous mode, where a human-operator (not shown) of the host-vehicle 12 may do little more than designate a destination in order to operate the host-vehicle 12. However, full automation is not a requirement. It is contemplated that the teachings presented herein are useful when the host-vehicle 12 is operated in a manual-mode 16 where the degree or level of automation may be little more than providing an audible or visual warning to the human-operator who is generally in control of the steering, accelerator, and brakes of the host-vehicle 12. For example, the system 10 may merely assist the human-operator as needed to change lanes and/or avoid interference with and/or a collision with, for example, an object such as another-vehicle, a pedestrian, or a road sign.

The system 10 includes an object-detector 18 that detects detectable-objects 20 such as other-vehicles, pedestrians, construction barriers, pot-holes, animals, debris, or any other objects proximate to, e.g. within 100 meters of (but possibly varies with the speed and/or location of) a host-vehicle 12 that may be preferably avoided by the host-vehicle 12. That is, the detectable-objects 20 may be anything that is preferably not run-over or collided with by the host-vehicle 12. The object-detector 18 may include or consist of a camera, a radar, a lidar, a proximity-sensor, or any combination thereof, which in this non-limiting example are mounted on or part of the host-vehicle 12. A variety of devices suitable for use on the host-vehicle 12 to use as the camera, the radar, the lidar, and the proximity-sensor to form the object-detector 18 are commercially available. These devices may be co-located in a single housing, or may be distributed at different locations about the host-vehicle 12, as will be recognized by those in the art.

The system 10 includes a receiver 22 that receives an indication of an object-presence 26 from other-transmitters 24 proximate to the host-vehicle 12. Those in the art will recognize that both the receiver 22 and each instance of the other-transmitters 24 may each be part of instances of a vehicle-to-vehicle (V2V) transceiver or a vehicle-to-infrastructure (V2I) transceiver. The use of the words 'receiver' and 'transmitter' is only to distinguish the function of what is part of the host-vehicle 12 from the function of what is part of each instance of the other-transmitters 24. That is, the receiver 22 is named so only to clarify that with regard to the system 10 described herein the function of the V2V/V2I transceiver in the host-vehicle 12 is to receive information from the other-transmitters 24. Likewise, each instance of the other-transmitters 24 may be part of individual instances of V2V/V2I transceivers located remote from the host-vehicle 12 such as in an other-vehicle 30A, 30B (FIG. 2) or a traffic-camera 32.

The object-presence 26 is information broadcast or transmitted by one or more instances of the other-transmitters 24. The object-presence 26 may indicate one or more instances of the detectable-objects 20 that are also detected by the object-detector 18, and/or one or more instances of a hidden-object 28 that is not detected by the object-detector 18 of the host-vehicle 12 but is detected by one or more instances of a detection-device 34 in communication with an instance of the other-transmitters 24. That is, it is contemplated that each instance of the other-transmitters 24 is in communication with their own form or version of an object-detector that may include the same or different devices (camera, radar, lidar, and/or proximity-sensor) as the object-detector 18 of the host-vehicle 12.

The object-presence 26 may include, but is not limited to: location information such as absolute-coordinates, i.e. global positioning system (GPS) coordinates, of the particular instance of the other-transmitters 24 from which the object-presence 26 was transmitted; an estimate of the absolute-coordinates or relative coordinates (distance and direction/bearing) of each of the detectable-objects 20 and/or one or more instances of the hidden-object 28 detected by the detection-device 34 in communication with a particular instance of the other-transmitters 24; a direction-of-travel 36 (FIG. 2) of the hidden-object 28 or the detectable-objects 20; a speed of the hidden-object 28 or the detectable-objects 20; a classification (e.g. another-vehicle, a pedestrian, a construction barrier, a pot-hole, an animal, debris, etc.) of the hidden-object 28 or the detectable-objects 20, an acceleration of the hidden-object 28 or the detectable-objects 20; and/or a yaw/pitch/roll angle of the hidden-object 28 or the detectable-objects 20.

Figure 2:
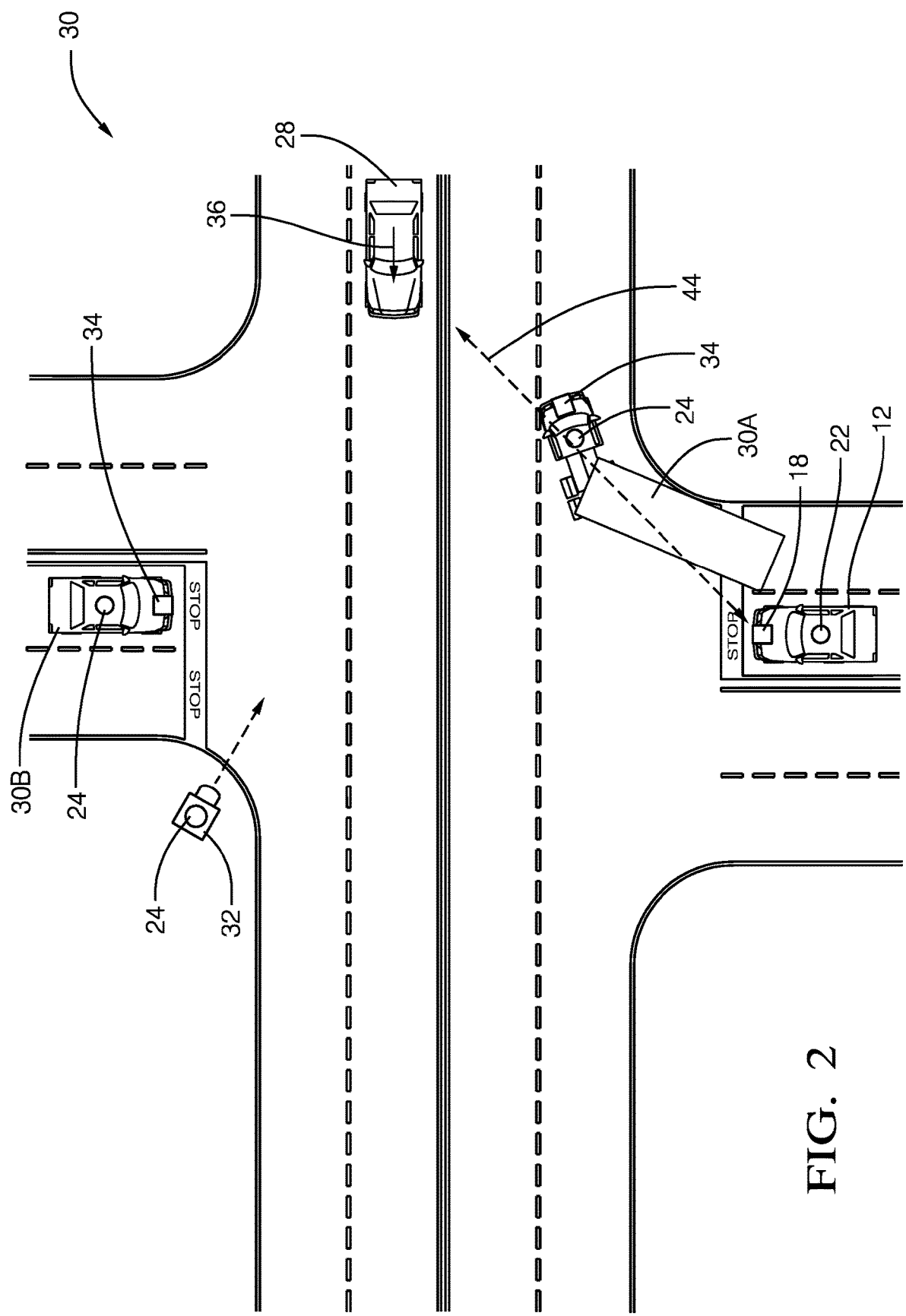
FIG. 2 is an illustration of a traffic-scenario encountered by the system of FIG. 1 in accordance with one embodiment.

FIG. 2 illustrates a non-limiting example of a traffic-scenario 38 that the system 10 may encounter. In this non-limiting example, the host-vehicle 12 is stopped at an intersection, and detection of the hidden-object 28 by the object-detector 18 of the host-vehicle 12 is prevented because the other-vehicle 30A is blocking or obstructing a portion of the field of view of the object-detector 18. In this example, the hidden-object 28 is another-vehicle approaching the intersection that the host-vehicle 12 is attempting to enter. By way of further example, if the object-detector 18 includes a camera, a line-of-site 44 from the camera to the hidden-object 28 is obstructed by the other-vehicle 30A. Those in the art will recognize that obstruction of the line-of-site 44 may also prevent or impede a lidar and/or a radar from detecting the hidden-object 28.

As suggested above, the host-vehicle 12 may receive information about the object-presence 26 of the hidden-object 28 from a single instance of the other-transmitters 24, but there is the aforementioned risk of hacking or spoofing of that information. To overcome or minimize that risk, the system 10 described herein is an improvement over prior systems in that the system 10 determines or establishes a redundancy of the object-presence 26 as described below. That is, if the same information about the hidden-object 28 is broadcast or reported by multiple instances of the other-transmitters 24, then the redundancy of that information is established and the object-presence 26 (or the lack of any instance a hidden-object) is deemed valid or secure rather than a product of hacking or spoofing. It is also contemplated that the method of operating the system described herein could also be useful to detect when an instance of the detection-device 34 has malfunctioned so may not be able to detect the hidden-object 28

Returning now to FIG. 1, the system 10 includes a controller 40 in communication with the object-detector 18 and the receiver 22. The controller 40 may include a processor (not specifically shown) such as a microprocessor or other control circuitry such as analog and/or digital control circuitry including an application specific integrated circuit (ASIC) for processing data as should be evident to those in the art. The controller 40 may include memory (not specifically shown), including non-volatile memory, such as electrically erasable programmable read-only memory (EE-PROM) for storing one or more routines, thresholds, and captured data. The one or more routines may be executed by the processor to perform steps for determining the redundancy of the object-presence 26 based on signals received by the controller 40 from the receiver 22 and the object-detector 18 as described herein.

To this end, the system 10, or more specifically the controller 40, is configured or programmed to operate the host-vehicle 12 using vehicle-controls 42 to avoid interference with (e.g. a collision with or otherwise impede the motion of) the hidden-object 28 when the hidden-object 28 is not detected by the object-detector 18 and the object-presence 26 is indicated by at least two instances of the other-transmitters 24. That is, the indication of the presence of the hidden-object 28 is not deemed valid or reliable by the system 10 until at least two instances of the other-transmitters 24 provide essentially the same information (e.g. coordinates, direction-of-travel 36, and/or classification) about the hidden-object 28.

As mentioned above, the hidden-object 28 may not be detected by the object-detector 18 of the host-vehicle 12 when the line-of-site 44 to the hidden-object 28 from the object-detector 18 is obstructed. The controller 40 may be further configured to determine which portion of the field-of-view of the object-detector 18 is obstructed, and compare the reported location of the hidden-object 28 indicated to the controller 40 by the other-transmitters 24. If the location of the hidden-object 28 indicated by the other-transmitters 24 corresponds to the portion of the field-of-view of the object-detector 18 that is obstructed, then that may be interpreted as evidence to support the validity or redundancy of the object-presence 26.

It is also contemplated that the system 10, or more specifically the controller 40, may be configured to operate the host-vehicle 12 to avoid interference with the hidden-object only when hosts (e.g. the other-vehicle 30A, 30B, or the traffic-camera 32) of the other-transmitters 24 are detected by the object-detector 18. Those in the art will recognize that is known to transmit the GPS coordinates of an instance of the other-transmitters. If those GPS coordinates are located within the field-of-view of the object-detector 18, and there is nothing detected by the object-detector at those GPS coordinates, e.g. the presence of the traffic-camera 32 or the other-vehicle 30B are not detected by the object-detector, then that may be an indication that the information from that particular instance of the other-transmitters should not be trusted. That is, the validity of information received from a host of an instance of the other-transmitters 24 that cannot be detected by the object-detector 18 of the host-vehicle 12 may not be deemed as reliable.

In the traffic-scenario 38 illustrated in FIG. 2, if the object-presence 26 of the hidden-object 28 does not have sufficient redundancy, i.e. the information from the other-transmitters 24 is in question, the controller 40 may be configured to simply wait until the other-vehicle 30A has completed the turn so the other-vehicle 30A no longer obstructs any of the field-of-view of the object-detector 18. Other non-limiting example scenarios will now be described is reference to FIG. 1, but not illustrated.

In one scenario, a pot-hole or debris may be located in a travel-lane of the host-vehicle 12, but the pot-hole or debris cannot be detected by the object-detector because one or more other-vehicles are traveling forward of the host-vehicle 12. If the pot-hole or debris are indicated by the object-presence 26, and there is sufficient redundancy (e.g. at least two instances of the other transmitters report the presence of the pot-hole or debris, the hidden-object 28 in this example) then the controller 40 may operate the host-vehicle to steer-around the hidden-object 28, e.g. change lanes. Alternatively, if there is no space to steer-around the hidden-object, the controller 40 may stop the host-vehicle and wait until there is space or turn-over control of the host-vehicle to an operator of the host-vehicle, e.g. switch to the manual-mode 16.

The system 10 may include a warning-device, audible (e.g. acoustic-transducer or speaker) and/or visible (e.g. light-source, or display) to an operator of the host-vehicle 12. Then, when the system 10 is being operated in the manual-mode 16, the controller 40 may activate the warning-device to alert the operator to the presence of the hidden-object 28

Accordingly, an object-detection system (the system 10), a controller 40 for the system 10, and a method of operating the system 10 is provided. The system 10 overcomes the problems of hacking or spoofing of information reported by the other-transmitters 24 of a DSRC communications network by assigning a validity to the information based on the redundancy of the object-presence 26 reported by the other-transmitters 24.

While this invention has been described in terms of the preferred embodiments thereof, it is not intended to be so limited, but rather only to the extent set forth in the claims that follow.

We claim:
1. An automated vehicle comprising:
an object-detector;
a receiver;
a controller in communication with the object-detector and the receiver, said controller configured to:
    obtain, using the receiver, data from two or more transmitters;
    determine, based on the data, a location of an object that is separate from the two or more transmitters;
    determine, based on the data, a classification of the object;
    determine, based at least in part on a comparison of the location with data related to a field-of-view of the object-detector and the classification of the object, whether the object is detected in the field-of-view of the object-detector; and
    in accordance with the object being detected in the field of view, operate the automated vehicle to avoid interference with the object.

2. The automated vehicle in accordance with claim 1, wherein the object is not detected by the object-detector when a line-of-sight to the object from the object-detector is obstructed.

3. The automated vehicle in accordance with claim 1, wherein the automated vehicle is operated by the controller to avoid interference with the object when hosts of the two or more transmitters are detected by the object-detector.

4. The automated vehicle of claim 3, wherein at least one of the hosts is another vehicle.

5. The automated vehicle of claim 3, wherein at least one of the hosts is a traffic camera.

6. The automated vehicle of claim 1, wherein the controller is further configured to:
    determine, based on the data, a direction of travel of the object; and
    determine, based at least in part on the location and direction of travel, whether the object is detected in the field-of-view.

7. The automated vehicle of claim 1, wherein the object is another vehicle.

8. The automated vehicle of claim 1, wherein the data from the two or more transmitters is redundant.

9. The automated vehicle of claim 1, wherein the automated vehicle is located at an intersection, and in accordance with the object not being detected in the field of view of the object-detector, command the automated vehicle to wait a period of time before entering the intersection.

10. A method comprising:
    obtaining, using a receiver of an automated vehicle, data from two or more transmitters, wherein the data from the two or more transmitters is redundant;
    determining, based on the data, a location of an object;
    determining, based on the data, a direction of travel of the object;
    determining, based at least in part on the location and direction of travel, whether the object is detected in the field-of-view of an object-detector of the automated vehicle; and
    in accordance with the object being detected in the field of view, operate the automated vehicle to avoid interference with the object.

11. The method of claim 10, wherein the object is not detected by the object-detector when a line-of-sight to the object from the object-detector is obstructed.

12. The method of claim 10, wherein the automated vehicle is operated by the controller to avoid interference with the object when hosts of the two or more transmitters are detected by the object-detector.

13. The method of claim 12, wherein at least one of the hosts is another vehicle.

14. The method of claim 12, wherein at least one of the hosts is a traffic camera.

15. The method of claim 10, wherein the controller is further configured to:
    determine, based on the data, a classification of the object; and
    determine, based at least in part on the location and classification, whether the object is detected in the field-of-view.

16. The method of claim 10, wherein the object is another vehicle.

17. The method of claim 10, wherein the automated vehicle is located at an intersection, and in accordance with the object not being detected in the field of view of the object-detector, command the automated vehicle to wait a period of time before entering the intersection.

* * * * *